Patented Nov. 14, 1922.

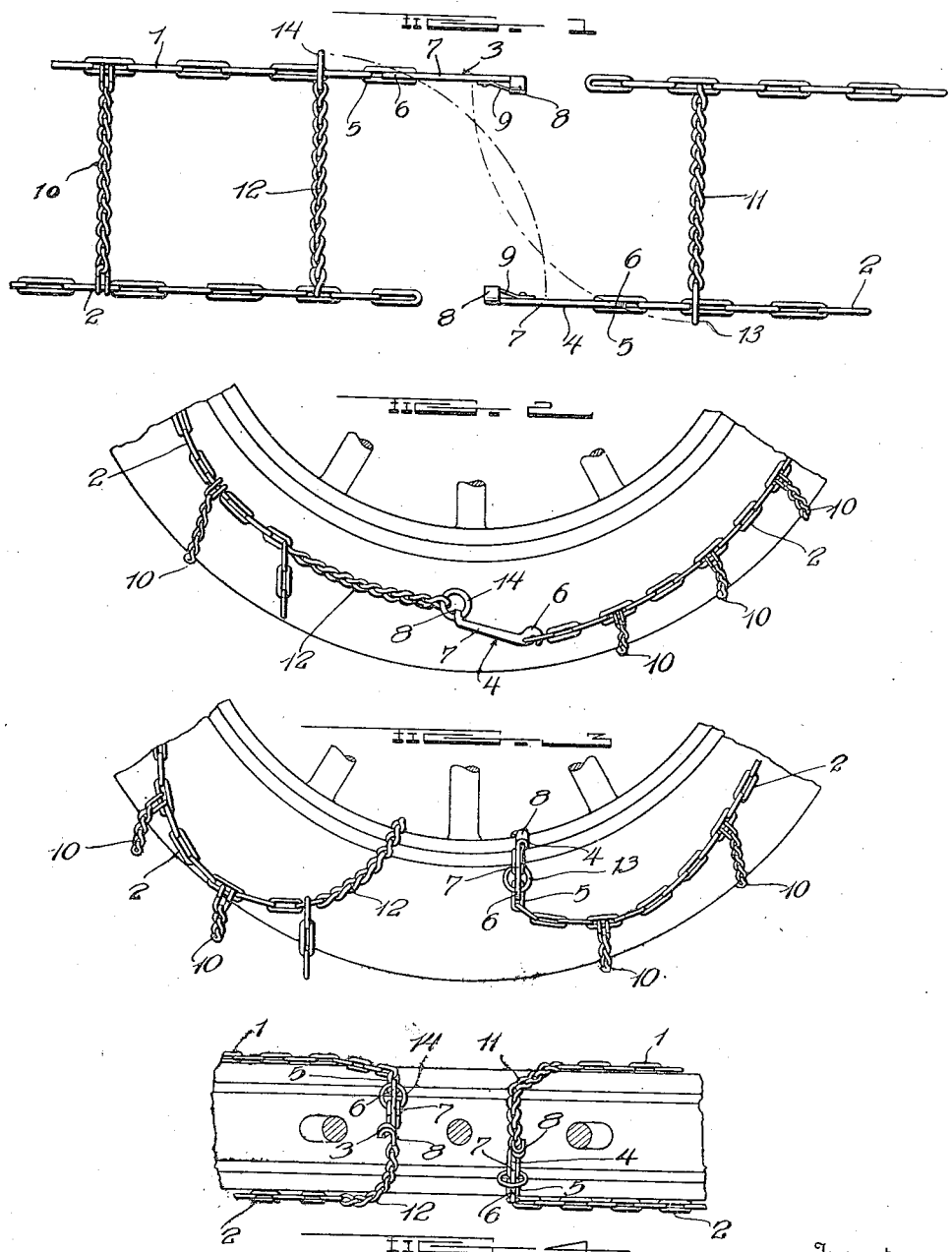

1,435,626

UNITED STATES PATENT OFFICE.

EBEN C. SPEIDEN, OF NIAGARA FALLS, NEW YORK.

NONSKID DEVICE.

Application filed March 13, 1922. Serial No. 543,387.

*To all whom it may concern:*

Be it known that I, EBEN C. SPEIDEN, a citizen of the United States, residing at Niagara Falls, in the county of Niagara and State of New York, have invented certain new and useful Improvements in Nonskid Devices, of which the following is a specification.

This invention relates to nonskid devices for use with motor vehicle tires and particularly to nonskid devices which are formed with two side strands and a plurality of cross strands. According to the usual construction of these devices the length of the side strands is but slightly in excess of the perimeter of the band or ring which the strands form when the nonskid device is in position on a tire and the spacing of the cross strands is such that there is always at least one cross strand between the tire and the ground. With these constructions it is not possible to attach the device to an automobile tire unless the nonskid device is first placed on the ground and the tire is moved into position over it, or unless the tire is raised from the ground.

An object of this invention is to provide a nonskid device which may be attached to a tire in the customary manner and which, in addition, may be quickly attached to an automobile tire in a temporary manner when conditions are met which render it undesirable or impossible to jack up the tire or to move the automobile. A further object is to provide a device of the type stated which after having been temporarily attached to a tire may be readily attached in the normal manner after the tire has been moved. A further object is to provide a nonskid device which while similar in general construction to the present devices of this type has certain of the parts so designed that the device may be readily applied to a tire in a temporary manner when it is not practical to apply it in the normal manner. A further object of the invention is to provide a nonskid device which will attain the object last stated and in which the parts which permit the attachment of the device in an emergency or temporary manner do not interfere with the normal operation of the device when it is applied in the usual manner. More specifically, an object of the invention is to provide a nonskid device in which certain of the cross strands may be used to form temporary extensions of the side strands, or alternatively, these cross strands may be used to attach the device to the tire by fastening the separate ends of the device to the felly of the wheel.

An embodiment of my invention which will attain these objects is illustrated in the accompanying drawings, in which Fig. 1 is a fragmentary plan of the device and showing the two ends thereof in juxtaposition, but not connected;

Fig. 2 is an elevation of the lower portion of an automobile wheel and tire and showing the nonskid device applied in a temporary manner;

Fig. 3 is a similar fragmentary elevation showing the device applied in a different emergency or temporary manner;

Fig. 4 is a fragmentary horizontal section of the parts shown in Fig. 3.

In the drawings, the side strands of the nonskid device are designated by the numerals 1, 2 and each of these strands is provided at one end thereof with a connecting element or fastener which is adapted to engage the other end of the respective strand when the nonskid device is applied to a tire. These connecting elements or fasteners 3, 4 are located at the oppositely disposed ends of the two side strands 1, 2, respectively, thus providing one connecting element at each end of the device. The particular form of the connecting member forms no part of my invention but I have found that the form illustrated is well adapted for use with nonskid devices embodying my invention. These connecting elements or fasteners which are designated generally by the numerals 3, 4 are identical in construction and as best shown in Figs. 1 and 2, the fastener 4 consists in a link 5 which is attached to the end of the side strand 2 and a lever pivoted on the link. This lever has a hook end 6 which cooperates with the link 5 to form a fastening device and an opposite or keeper end 7 which has a U-portion or hook 8 at the end thereof, the opening of the hook 8 being normally closed by the leaf spring 9 which is mounted on the portion 7 of the lever.

The cross strands which are located at the opopsite ends of the device, and which for convenience will be designated as the "terminal" cross strands, are not permanently attached at both ends to the side strands 1, 2 as are the other or "intermediate" cross strands 10, but have only one end permanently attached to the side strands. These terminal cross strands 11, 12 have one end attached, respectively, to the side strands 1, 2 at or near the ends thereof which are opposite the connecting element ends. The free end of each of the terminal cross strands 11, 12 is provided with means for detachably securing the same to the side strands 2, 1, respectively, and in the preferred construction this means consists in links or rings, 13, 14, respectively, through which the connecting element end of the appropriate side strand may be passed.

When the device is to be applied to a tire in the normal manner the free ends of the terminal cross strands are connected to the side strands by passing the fasteners 3, 4 through the links or rings 14, 13, respectively, as shown in Fig. 1. The device is then applied to the tire in the usual manner.

Under certain conditions, however, it may be undesirable or impossible to jack up the wheels or to move them onto chains which have been placed on the ground, as would be the case if the vehicle were standing or stalled in ruts on soft ground. The device may then be attached to the tire as shown in Fig. 2. The terminal cross strands are used to form temporary extensions of the side strands by slipping the rings 13, 14 off of the side strands 2, 1, respectively, whereupon the strands 11, 12 may be swung over as shown by the dotted lines in Fig. 1 to form extensions of the side strands 1, 2, respectively. The center portion of the device is then placed upon the top of the tire and the ends may be joined as shown in Fig. 2 by engaging the rings 13, 14 with the connecting elements 3, 4, respectively. The device when applied in this way will afford sufficient traction to move the car until it is out of difficulty and the device may then be secured to the tire in the normal manner.

In some cases, as when the tire is badly mired, the device may be attached as shown in Figs. 3 and 4. In this operation the free ends of the terminal cross strands are detached from the side strands and the device is draped over the top of the tire. The terminal cross strands are then passed over the felly of the wheel and reconnected to the side strands by engaging the rings 13, 14 with the connecting elements 4, 3, respectively. In this manner the separate ends of the nonskid device are each connected to the wheel and the car can then be moved sufficiently to allow the application of the device in the normal manner.

Nonskid devices of this general type are customarily formed of chain links and are commonly known as "tire chains." While the embodiment which I have illustrated is constructed of chain links it is to be understood that the various strands which make up the device may be formed of chain or other suitable metal members, of flexible cables or of such other material as may be suited for the construction of devices of this character. While the embodiment which is herein described is the preferred form of my invention it is to be understood that the invention is not limited thereto since various changes may be made in the several parts of the device, such for example, as the substitution of other forms of connecters for the elements 3, 4, 13 and 14, and that these and other changes in the various parts their shape, size and relative location may be made without departing from the spirit of my invention as set forth in the following claims.

I claim—

1. A nonskid device comprising a pair of side strands, a connecting element at one end of each of said side strands, intermediate cross strands attached to said side strands, a terminal cross strand attached to each of said side strands at the end thereof opposite the connecting element, and means on the free end of each of said terminal cross strands alternatively engageable with the connecting element of the side strand to which said terminal cross strand is attached or with the other side strand, whereby said terminal cross strands may serve as temporary extensions of said side strands.

2. A nonskid device comprising two side strands, a connecting element on each of said side strands, said connecting elements being arranged at the oppositely disposed ends of said device, intermediate cross strands attached to said side strands, a terminal cross strand attached to each of said side strands at the end thereof opposite to the connecting element, and means on the free end of each of said terminal across strands alternatively engageable with the connecting element of the side strand to which said terminal cross strand is attached or with the other side strand.

3. A nonskid device comprising a pair of side strands, a connecting element on each of said side strands, said connecting elements being arranged at the oppositely disposed ends of said device, intermediate cross strands attached to said side strands, a terminal cross strand attached to each of said side strands at the end opposite the connecting element thereof, and means on the free end of each of said terminal cross strands interchangeably engageable with either connecting element, whereby the device may be temporarily applied to a tire, or with the side strand to which said terminal cross strand is not attached, whereby said terminal cross strands serve as normal cross chains.

In testimony whereof, I affix my signature.

EBEN C. SPEIDEN.